Feb. 10, 1931.　　　　J. W. AMES　　　　1,792,349
METHOD OF AND APPARATUS FOR UTILIZING WASTE METAL IN THE
PRODUCTION OF COMMERCIAL BARS
Filed July 8, 1927　　　2 Sheets-Sheet 1
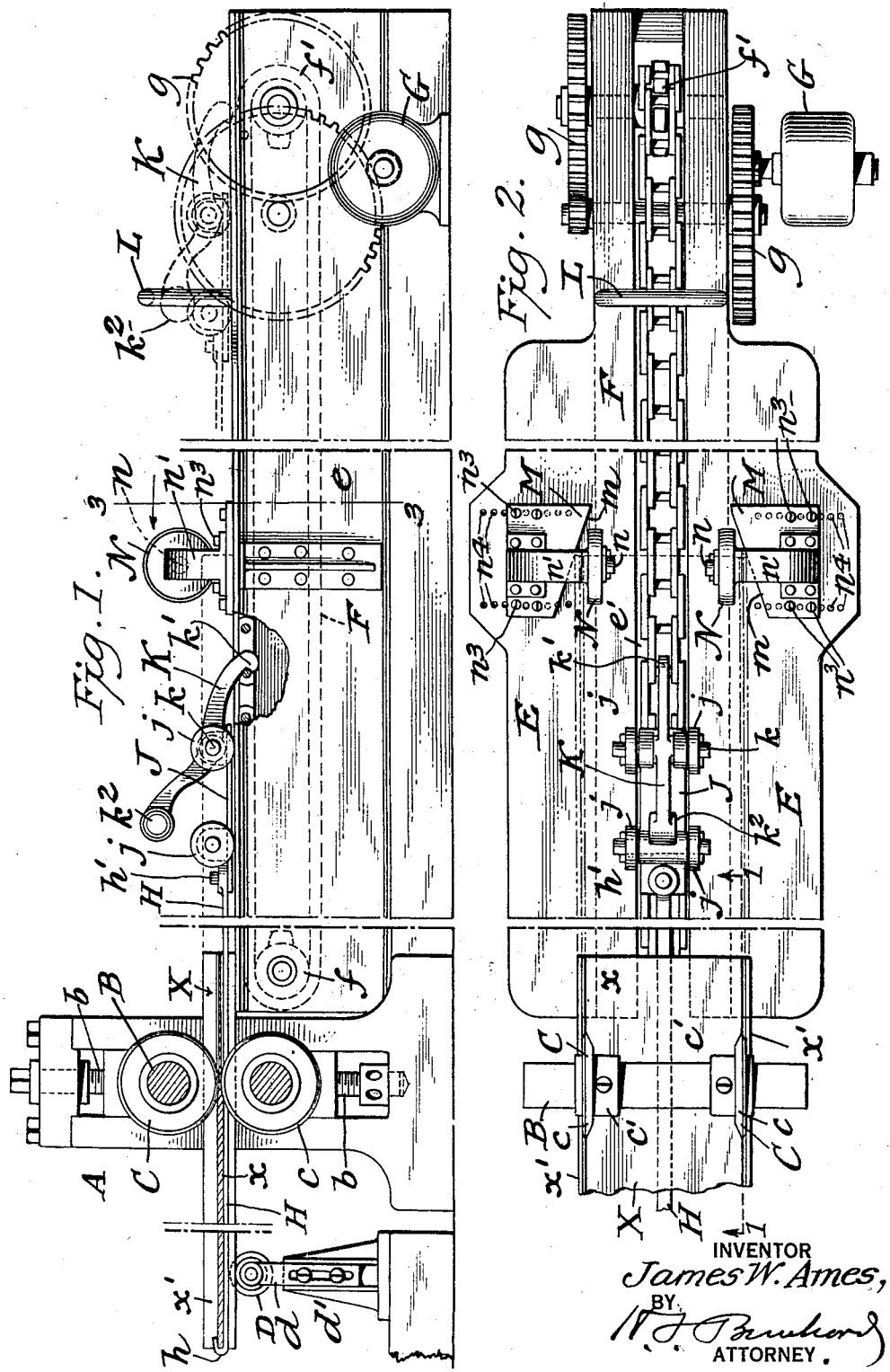
INVENTOR
James W. Ames,
BY
ATTORNEY.

Feb. 10, 1931.  J. W. AMES  1,792,349
METHOD OF AND APPARATUS FOR UTILIZING WASTE METAL IN THE
PRODUCTION OF COMMERCIAL BARS
Filed July 8, 1927   2 Sheets-Sheet 2
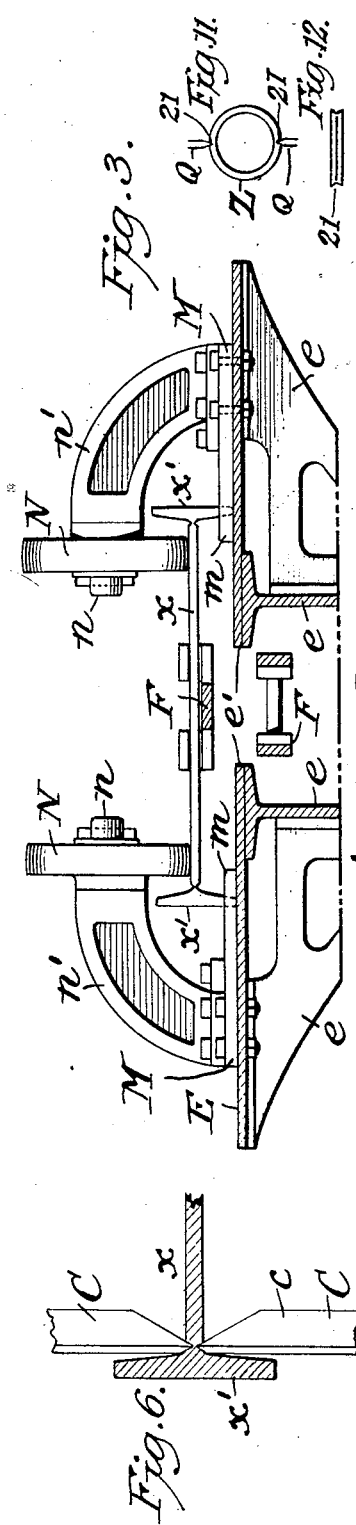
INVENTOR,
James W. Ames,
BY
ATTORNEY.

Patented Feb. 10, 1931

1,792,349

UNITED STATES PATENT OFFICE

JAMES W. AMES, OF JERSEY CITY, NEW JERSEY

METHOD OF AND APPARATUS FOR UTILIZING WASTE METAL IN THE PRODUCTION OF COMMERCIAL BARS

Application filed July 8, 1927. Serial No. 204,205.

This invention pertains to the utilization of waste metal, such as steel beams and metal tubing, in the production of bars, rods and structural shapes such as angles, and the like; and it involves an apparatus, as well as a novel mode of procedure, whereby metal ordinarily treated as waste or scrap, may be initially slitted, grooved or weakened while in a cold condition, and thereafter, or concurrently, separated or flattened into individual long pieces also while in a cold condition, preliminary to conversion by heating and rolling into commercial rods, bars or structural shapes, appropriate for various usages, such as structural bars, and for concrete construction, as well as for a variety of other purposes.

The object of the invention is to conduct the operations of slitting and separating the metal while in a cold condition and in an efficient and expeditious manner to the end that cold metal may by subsequent operations be converted into commercial bars and shapes with a minimum expenditure of time, labor and material.

In my invention, the slitting or cutting of the cold metal is effected by the conjoint operation of rotary cutters and a draw bar to which motion is imparted for effecting the movement of the metal under treatment through and between the rotary cutters, together with pressure means acting on the cold metal subsequently to the slitting thereof by the rotary cutters, said pressure means being at a distance from the rotary cutters and said draw bar acting to impart motion to the slitted metal for moving it relatively to said pressure means.

It has been found that rotary rolls for feeding the cold metal is not desirbale for several reasons, among which are that irregularities in the surfaces of the previously used and ordinarily considered waste metal act to hinder the feeding motion of such rolls, with the result that the rolls sometimes "spin" or turn with respect to the metal without imparting motion thereto, defeating to a considerable extent the purpose of such rolls. Such irregularities in the surface of the metal are occasioned either by the presence of foreign material adherent to the surface or to abrasions or dents in the surface, to accumulated rust and paint on the surface, and to a variety of other conditions. Again, in slitting or cutting structural shapes of different sizes and cross sections, undue care and caution is required in the adjustment of the rolls for effecting the feed however imperfect and unsatisfactory such feed may be.

These objections and others are overcome in my invention by using non-feeding rotary cutters, the sole function of which is to slit or cut the metal. The cold metal is moved between the rotary cutters by a traveling drawbar attachable to the metal, said drawbar acting solely to draw the metal with a traveling motion between the rotary cutters. The cutters are idle in their mountings and they are rotated on their axes by frictional engagement with the moving metal. The drawbar is independent of the rotary cutters, and it is attachable to the metal regardless of the character or dimensions of the metal to be severed and separated. Said drawbar is operated by appropriate pulling means independently of the idle motion of the rotary cutters, and said pulling means imparts motion to the drawbar with respect to both the rotary cutters and to the pressure mechanism. The drawbar is attachable either to structural shapes or compacted tubes or to any other kind of pre-used cold metal adapted for treatment in the machine; in fact, the drawbar operates on metal of any appropriate character and independently of the adjustments or positions of the rotary cutters in adapting them for service on diverse characters of metal to be slitted and separated.

The pressure mechanism as I have constructed and operated it includes a plurality of rolls arranged for contact with the moving metal and positioned in such relation to the bed over which the metal is drawn by the drawbar that spaces of appreciable width are caused to exist between the bed and the moving metal, said spaces being at and below the pressure rolls, to the end that at the places where the rolls act to apply pressure there exists a free or unrestricted under space below the moving metal, whereby the pressure rolls are effective in deflecting and bending the metal along the line or lines of the slit or slits produced by the rotary cutters, as a result of which the slitted metal is either broken into individual parts, or are so joined by tenuous metal that the physical separation is thereafter performed with facility.

In my invention, I do not use rolls for effecting the feed motion of the metal, but reliance is placed upon disk-like cutters spaced relatively to each other on a shaft with which the cutters are rotatable, and this shaft is mounted for rotation idly in appropriate bearings of a housing. It is preferred to use two sets of rotary cutters, the cutters of each set being above and below the path of the moving metal, and the two set of cutters are spaced relatively to each other on the respective shafts. The shafts are relatively adjustable to accommodate the cutters to metal of varying cross sectional sizes, and said cutters are shiftable on the shafts to regulate the distance between parallel slits produced on the metal by the rotary action of the cutters, whereby the cutters may be changed in positions to suit the material to be operated upon and which adaptation is effected regardless of the feed motion to be given to the metal by the travel of the drawbar.

The flattened tube, or the separated pieces of the structural shapes, are now heated by appropriate means to a working temperature, and the heated pieces are rolled into commercial bars or rods of a desired cross section both as to length and dimensions.

Other functions and advantages of the invention will appear from the following description taken in connection with the drawings, wherein—

Figure 1 is a view in side elevation, partly broken away, and in section on the line 1—1 of Figure 2, illustrating the draw bench and the grooving or slitting cutters for operation upon a metal tube, or upon a structural shape, to perform the preliminary operations of separating the web and the flanges of said structural shape into individual pieces of metal.

Figure 2 is a plan of the mechanism illustrated in Figure 1.

Figure 3 is a vertical cross section on the line 3—3 of Figure 1.

Figure 4 is a detail cross sectional view showing the operation of the bending mechanism whereby the flanges of a structural shape are deflected with respect to the web of said shape.

Figure 5 is a perspective view of the structural shape (I-beam) with the flanges and the web in a condition for effecting their physical separation with facility.

Figure 6 is a detail view illustrating the operation of the cutters upon the web close to the flanges of a structural shape.

Figure 7 is a detail showing means whereby a round bar is rolled, and

Figure 8 is a perspective of one form of commercial bar.

Figures 9 and 10 are views, respectively, of the rolls and the product of such rolls, the same being a bar of square cross section.

Figures 11, 12 and 13, illustrate the means for, and procedure followed, in grooving a steel tube, and of flattening said tube preparatory to conversion into commercial bars or rods.

I have elected in the accompanying drawings and in the following description, to disclose my invention as adapted for the conversion of I-beams, or other structural shapes, into commercial bars, rods, or structural shapes, certain examples of which are shown in Figures 8 and 10; but it will be understood that the invention is not restricted to the utilization of I-beams for the reason that it is useful, also, in the conversion of metal tubes into commercial bars, rods, plates or structural shapes, to which end I have illustrated diagrammatically the procedure in Figures 11, 12, and 13, of the tube conversion.

Referring now more particularly to Figures 1, 2, and 3, A designates a housing of any suitable or appropriate form, and B, B, a pair of shafts supported or mounted as usual in said housing, said shafts being movable by the action of screws $b$ for regulating the size of the pass constituted by the shafts. The shafts are provided with cutters C, shown in one practical form as a member with a bevel edge $c$, unitary with a collar $c'$ fitted on the shaft and attached fixedly thereto by appropriate means. For slitting an I-beam, indicated at X, it is preferred to use two sets or pairs of cutters, C, two on the top shaft and two on the bottom shaft, and to arrange these pairs in complemental sets positioned for operation on the web $x$ adjacent the flanges $x'$ of said beam, it being desirable to cut or slit the web $x$ as close as possible to the respective flanges $x'$ in order to eliminate a rib or fin unitary with the flanges when the latter are separated from the web. Said web is severed from the flanges so as to produce a flat plate $x$, Figure 5, which flat plate is useful for various purposes.

As shown in Figure 1 of the drawings, the shafts B which carry the cutters are parallel and are spaced apart a suitable distance to enable the drawbar H, presently described, to be movable freely in the space intervening said shafts. As shown, the cutters C, C, are in two pairs, the cutters of each pair being positioned one below the path of the metal and the other above the path of the metal. The cutters of one pair are attached to the shafts B, B, in spaced relation to the cutters of the other pair on the same shafts. The cutters are rotatable with the shafts; they are movable with the shafts when the latter are relatively adjusted to accommodate the cutters to metal of varying cross sectional dimensions, and said cutters C are adjustable on the shafts with respect one to the other in order to desirably space the cutters for slitting or grooving the metal on parallel lines at a determined distance one from the other.

The rotary cutters C, C, perform the sole fuction of slitting or grooving the metal, and they are mounted idly to the end that they have no function as a means for feeding the metal. On the contrary, the traveling motion is given to the metal by the pull of the drawbar H, and accordingly the rotary cutters are rotated by frictional engagement with the metal which is moved by the pull of the drawbar as stated.

D is a supporting and guiding roll positioned at one side of shafts B and cutters C, and substantially in the horizontal plane of the pass between said cutters. As shown, roll D is an idler supported by adjustable members $d$ in a fixed bracket $d'$ for raising or lowering the idler roll D.

E is a table supported in a horizontal position at the other side of shafts B and cutters C from the idler roll D. Said table is fixedly held by an appropriate framework, $e$, to occupy a horizontal position below the pass between the cutters, and said table is divided by a longitudinal slot $e'$ extending centrally with respect to the table.

F is a power operated draw chain composed of links appropriately joined together, said draw chain being supported at the end adjacent the cutters C by an idler sprocket $f$ mounted in the framework $e$, whereas the other end of said draw chain is engaged with a driving sprocket $f'$, the shaft of which is journaled in bearings of the underframework $e$ constituting a part of the structure hereinbefore referred to as a "draw bench." As shown, this driving sprocket $f'$ is power driven, the power being furnished by a suitable motor, G, and the energy of said motor is communicated through a train of gears $g$ to the power sprocket $f'$, although it will be understood that any appropriate mechanism may be employed for operating the draw chain F by power.

The material to be operated upon is connected to the draw chain, and as an operative means to this end, I provide a draw bar H, shown in Figures 1 and 2 as a long bar having a hook-shaped end $h$ adapted for engagement with the material, such as the I-beam X or a metal tube Z, shown in Figures 11 and 12.

It is desirable to provide a detachable coupling between the draw chain F and draw bar H, and to automatically operate said coupling for releasing the draw bar from the draw chain F when the draw bar approaches the driving sprocket $f'$. To these ends, a carriage J is provided, said carriage being adapted to travel in the slot $e'$ of the table E, and said carriage having rollers $j$ adapted to ride upon said table E. The draw bar H is connected at one end to the carriage J as by a king bolt $h'$, and thus the draw bar and the carriage are coupled together for conjoint movement. Said carriage is equipped with a latch K, adapted for engagement with a link of the draw chain. As shown, the latch is pivotally supported intermediate its ends on an arbor $k$ mounted on carriage J, and at one end the latch is shown as having a hook $k'$, whereas the other free end of the latch is provided with a shoe $k^2$. The hook $k'$ of the latch is adapted for engagement with a part of the draw chain F, as shown in Figures 1 and 2, whereby the draw chain imparts movement to the carriage J and draw bar H, but as the carriage approaches the limit of its movement with respect to the table, the latch $k$ is disengaged automatically from the draw chain by the shoe $k^2$ of said latch coming into contact with a trip, L, shown in Figures 1 and 2, as a yoke-shaped member erected on the table in a position near the sprocket $f'$ and bridging the table slot $e'$ so that the trip is in the path of the shoe $k^2$, as indicated by dotted lines in Figure 1, whereby the contact of the shoe with the trip operates to turn the latch and release its hook $k'$ from the draw chain link, and thus the travel of the carriage and the draw bar are arrested automatically while the draw chain F continues in motion.

The power of the motor-driven draw chain is utilized for bending the product subsequently to the operation of slitting or weakening the same by the action thereon of idle cutters C, and to this end provision is made for applying pressure to the flanges $x'$ and to the web of the I-beam while the latter is in motion under the pull of the draw bar H and draw chain F. Such pressure means are embodied in a practical form by the employment of cam-shaped pressure members M, M, and pressure rolls N, N, positioned in the path of the I-beam X. The pressure members M are shown as substantial plates fixed to the table E, said plates having cam-shaped edges $m$, which are inclined to the path of movement of the beam X, and are positioned in the path of flanges $x'$ of said beam X. The pressure rolls N, N, are in overhanging relation to the pressure members M, M, and to the path of the material under manipulation, said rolls being idly mounted on stub axles $n$ supported in brackets $n'$ fixed to the table E at the opposite sides of slot $e'$ therein. As shown, the pressure plates M, M, are stationary on the table with the inclined edges $m$ of said plates in converging relation toward the sprocket $f'$ and with said edges separated by an intervening space of tapering or wedge form, so that the space decreases gradually in width, whereby the cam edges $m$ coact with the flanges $x'$ of the beam X as the latter is drawn by the power mechanism, with the result that said edges $m$ displace the flanges $x'$ relatively to the web $x$, as shown in Figure 4, thus bending and breaking the flanges $x'$ along the lines of weakness in the beam.

The operation of preliminarily conditioning an I-beam will be understood from the foregoing and the production of commercial bars may be stated as follows:—A beam X is positioned on the idler roller D, the carriage J is moved to a position close to the cutters C, draw bar H is hooked at one end to the beam and connected at the other end by king bolt $h'$ to the carriage, said bar passing between the cutters C, and latch K is adjusted for engagement with the draw chain F'. With the motor in action, the draw chain is operated by the sprocket $f'$, and thus the carriage and the draw bar are moved by power to haul the beam between the idle shafts B and cutters C. Said cutters C act upon the web $x$ close to the flanges $x'$ of the beam X to produce grooves or slits indicated at 20 in the web, said grooves or slits being formed in the respective surfaces of the web, and constituting a plurality of lines of weakness lengthwise of the beam. The operation of grooving or slitting the beam by the formation of lines of weakness continues so long as the beam is pulled between the rotary cutters, but usually these grooves do not extend or cut through the web, although it is feasible to cut and break the cold beam in one operation by merely slitting and breaking the beam by the action of the rotary cutters. As the beam is drawn with the drawbar and the draw chain, the ends of the beam flanges $x'$ contact with the pressure plates M, whereas the beam web contacts with the pressure rolls, as shown in Figure 3, and thus the resistance of the cam edges $m$ tends to deflect the beam flanges and to bend and break the beam along the lines of weakness 20, see Figure 4, the pressure being applied progressively to bend and break the flanges by the power of the moving draw chain. The beam, weakened along the lines 20, is thus bent while in a cold condition and under the pull of the draw chain, with the result that the beam is bent and broken into separate individual pieces; in fact, the beam is or may be broken concurrently with the bending operation. Thereafter, the individual pieces constituted by the flanges $x'$, are heated by appropriate means and to a working temperature, and while heated, said pieces are subjected to the action of rolls O, see Figure 7, to produce round bars O', see Figure 8; or the pieces may be acted on by rolls P', see Figure 9, to result in bars P' of square cross section, see Figure 10. The flat piece $x$ is useful in the arts, the same constituting a plate produced from the rail web.

It should be stated that the pressure members M and the brackets $n$ for the pressure rolls N are fastened adjustably to the table as by the use of bolts $n^3$ which pass through holes $n^4$, whereby provision is made to adapt the pressure elements for operation upon beams of varying sizes.

For conditioning tubular metal in a cold condition for conversion into commercial bars, I make use of rotary cutters Q, see Figure 11, operating to produce lines of weakness at 21 in the opposite sides of a steel tube Z. The tubular metal is thereafter flattened by the application of pressure, as by a power hammer, or by any other available mechanism, in which operation the metal bends with facility along the lines of weakness. The tubular metal is thus crushed by pressure to the flattened condition shown in Figure 12, and thereafter the metal is sheared lengthwise into strips of proper width, and these strips are heated to a working temperature and reduced to the condition of a billet, as in Figure 13, and while heated the metal is rolled by either of the rolls shown in Figures 7 or 8 to produce commercial bars.

My invention provides ways and means whereby waste iron and steel may be conditioned with facility and thereafter converted into commercial rods, bars, or structural shapes, with minimum expenditure of time and labor, for the reason that the metal is weakened at the initial stage and while in a cold condition through the agency of motive power applied during the grooving or slitting operation and during the bending and breaking operations.

Having thus fully described my invention, what I claim as new and desire to secure by Letters Patent is:—

1. In a metal working machine, the combination of a traveling draw member for imparting movement to metal in a cold condition, and rotary cutters operable upon the metal for grooving or slitting the same, said cutters being rotated by frictional engagement with the moving metal.

2. In a metal working machine, the combination of a draw member movable in a rectilinear path for imparting movement to metal in a cold condition, and rotary cutters positioned for engagement with the metal, said cutters being mounted for idle relative movement and being rotated on their axes by the traveling motion of the metal under the action of said draw member.

3. In a metal working machine, the combination of rotary cutters mounted for relative idle movement, a draw bar movable relatively to and in a path between said rotary cutters, for imparting movement to metal and drawing the same through and between said rotary cutters whereby the motion of the metal imparts rotative motion to the cutters, a power-operated draw chain, and means for coupling said draw bar to said draw chain, whereby motion in a rectilinear path is imparted to said draw bar.

4. In a metal working machine, the combination of rotary cutters mounted for relative idle movement and operable for slitting or grooving metal in a relatively cold condition, a pressure mechanism in spaced relation to said rotary cutters for applying bending pressure to the metal subsequent to the slitting or grooving operation of said rotary cutters, and a draw member separate from said rotary cutters and said pressure mechanism, said draw member being operable for imparting motion to the metal relatively to the rotary cutters and to the pressure mechanism.

5. In a metal working machine, the combination of rotary cutters positioned in the path of movement of cold metal for slitting or grooving said metal to produce lines of weakness thereon, pressure members in the path of the metal and spaced with reference to the rotary cutters for bending the metal along such lines of weakness, and drawing mechanism co-operable with and separate from said rotary cutters and said pressure members for imparting motion to metal with respect to said rotary cutters and to the pressure members.

6. In a metal working machine, the combination of a plurality of rotary cutters operable for slitting or grooving metal to produce lines of weakness therein, pressure rolls in spaced relation to the rotary cutters and positioned in the path of the metal under treatment for applying pressure to said metal and bending the same along such lines of weakness, and drawing mechanism for moving metal in a rectilinear path and relatively to the rotary cutters and to the pressure rolls.

7. In a metal working machine, the combination of rotary cutters, a table, drawing mechanism for moving metal in a rectilinear path over said table and with respect to said rotary cutters, and pressure mechanism positioned in the path of movement of the metal and operable for applying bending pressure to the metal, there being clearance spaces of appreciable depth between the table and the pressure mechanism for the deflection of the metal under the bending pressure.

8. In a machine for reworking metal in a cold condition, the combination of rotary cutters operable upon the metal during the movement thereof for slitting or grooving the same, a table, mechanism for moving the metal in a rectilinear path with respect to the rotary cutters and the table, and pressure rolls in the path of the metal moved by said mechanism for applying bending pressure to the metal, there being spaces of appreciable depth intervening the table and said pressure rolls for the deflection of the metal under the pressure applied by said pressure rolls.

9. In a machine for reworking cold metal, the combination of rotary cutters, a table, pressure mechanism including a plurality of stationary members and a plurality of rolls positioned in the path of movement of the metal under treatment, and drawing mechanism for imparting movement to the metal relatively to the rotary cutters and to the pressure mechanism, said drawing mechanism being operated independently of the rotary cutters.

10. In a metal working machine, the combination of a stationary table, a plurality of idle slitting rolls positioned at one end of said table, a draw bar having means for engagement with used metal in a cold condition, said draw bar being movable between said idle slitting rolls and being operable for imparting rotative motion to said idle rolls by drawing the metal engaged by said rolls, and a draw chain traversing said table and connected with the drawbar for moving the drawbar and the slitted metal relatively to the table whereby the metal under treatment lodges upon and traverses said table.

11. In a metal working machine, the combination of a stationary table, a plurality of idle slitting rolls mounted adjacent an end portion of said table, a draw bar movable in a rectilinear path between said idle rolls and adapted to traverse said table, said draw bar having means for engagement with used metal in a cold condition and said draw bar operating to impart rotary motion to said idle rolls by engagement of the rolls with the metal under treatment, a draw chain traversing the table and connected with the drawbar, a plurality of pressure rolls positioned on the table at the respective sides of the draw bar and in the path of the moving metal, and means for adjustably mounting the pressure rolls for adjustment upon the table relatively to the path of the draw bar.

12. In a device of the character described, the combination of a table, a plurality of cutters mounted thereon for free rotation, a draw bar provided with means for engaging used metal in a cold condition and adapted to draw the metal into engagement with said cutters, a draw chain adapted to be connected with said draw bar and means for automatically disconnecting the draw bar and draw chain.

13. In a device of the character described, the combination of a table, a plurality of cutters mounted thereon for free rotation, a draw bar provided with means for engaging used metal in a cold condition and adapted to draw the metal into engagement with said cutters, a draw chain adapted to be connected with said draw bar, latch means for connecting the draw bar to the draw chain and means for operating the latch means to disconnect the draw bar and draw chain.

14. In a device of the character described, the combination of a table, rotary cutters mounted thereon for free rotation, means whereby the cutters may be adjustably mounted, drawing mechanism for moving metal over said table and into engagement with said cutters, and a pressure mechanism positioned in the path of movement of the metal and operable for applying bending pressure to the metal.

15. In a device of the character described, the combination of a table, a plurality of cutters mounted thereon for free rotation, drawing mechanism for moving metal over said table and into engagement with said cutters, a pressure mechanism positioned in the path of movement of the metal and operable for applying bending pressure to the metal and means whereby the pressure mechanism may be adusted to various positions.

16. In a device of the character described, the combination of a table, a plurality of cutters mounted thereon for free rotation, a draw bar provided with means for engaging used metal in a cold condition and adapted to draw the metal in engagement with said cutters, a draw chain, a latch adapted to connect the draw chain with said draw bar, said latch being pivoted intermediate its ends and adapted to have one end connected with the draw chain, and means for engaging the opposite end of said latch for automatically disconnecting the draw bar and draw chain.

17. In a metal working machine, the combination of rotary cutters mounted for idle rotary movement, means for engaging the rear end portion of a metal element for imparting a moving force at the rear of the metal element, and forcing the same through and between said rotary cutters whereby the movement of the metal element imparts rotary motion to said cutters.

18. In a metal working machine for slitting metal elements, the combination of a support, a pair of rotary cutters idly mounted thereon in opposed relation in the path of movement of the metal element to be slit, and means for engaging the rear end of a metal element and forcing said element through and between said cutters, whereby the cutters are rotated to groove or slit the metal element as it passes therethrough.

19. In a metal working machine, the combination of a support, a plurality of rotary cutters idly mounted thereon, and means for engaging the rear end of a metal element and forcing said element through and between said cutters, whereby the cutters are rotated to groove or slit the metal element as it passes therethrough.

In testimony whereof I have hereto signed my name this 14th day of June, 1927.

JAMES W. AMES.